United States Patent
Kozloski et al.

(10) Patent No.: US 9,685,050 B2
(45) Date of Patent: Jun. 20, 2017

(54) ALERT SOUND ALTERATION

(71) Applicant: International Business Machines Corporation, Armonk, NY (US)

(72) Inventors: James R. Kozloski, New Fairfield, CT (US); Clifford A. Pickover, Yorktown Heights, NY (US); Maja Vukovic, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 42 days.

(21) Appl. No.: 14/672,490

(22) Filed: Mar. 30, 2015

(65) Prior Publication Data

US 2016/0292993 A1    Oct. 6, 2016

(51) Int. Cl.
| | |
|---|---|
| *G08B 23/00* | (2006.01) |
| *G08B 3/10* | (2006.01) |
| *G08B 7/06* | (2006.01) |
| *G08B 29/18* | (2006.01) |
| *H04M 1/725* | (2006.01) |
| *H04M 19/04* | (2006.01) |

(52) U.S. Cl.
CPC .............. *G08B 3/10* (2013.01); *G08B 7/06* (2013.01); *G08B 29/18* (2013.01); *H04M 1/72519* (2013.01); *H04M 19/044* (2013.01)

(58) Field of Classification Search
CPC ................................. G08B 3/10; G08B 29/18
USPC .................................... 340/501, 539.22, 635
See application file for complete search history.

(56) References Cited

U.S. PATENT DOCUMENTS

| | | | |
|---|---|---|---|
| 7,589,631 B2 | 9/2009 | Hovmalm et al. | |
| 7,884,714 B2 | 2/2011 | Fein et al. | |
| 8,036,391 B2 | 10/2011 | Cronin | |
| 8,484,344 B2* | 7/2013 | Butterfield | H04M 3/42382 709/202 |
| 8,836,502 B2* | 9/2014 | Culbert | H04M 1/72569 340/539.22 |
| 2005/0113147 A1 | 5/2005 | VanEpps, Jr. et al. | |
| 2012/0164993 A1 | 6/2012 | Bunk et al. | |
| 2014/0194104 A1 | 7/2014 | Mullen et al. | |
| 2014/0275856 A1 | 9/2014 | Kohlrausch et al. | |

OTHER PUBLICATIONS

James R. Kozloski et al., unpublished U.S. Appl. No. 14/986,598, filed Dec. 31, 2015, Alert Sound Alteration, pp. 1-28 and 7 sheets of drawings.
List of IBM Patents or Patent Applications.
Reis et al. "Mobile interaction: Automatically adapting audio output to users and contexts on communication and media control scenarios." Universal Access in Human-Computer Interaction. Intelligent and Ubiquitous Interaction Environments. Lecture Notes in Computer Science, vol. 5615, 384-393, Jul. 2009.

* cited by examiner

*Primary Examiner* — Qutbuddin Ghulamali
(74) *Attorney, Agent, or Firm* — Alexa L. Ashworth; Otterstedt, Ellenbogen & Kammer, LLP

(57) ABSTRACT

A method of updating a notification preference of a system includes detecting a remote alert, identifying at least one feature of the remote alert, determining a plurality of alerts available to the system, mapping the at least one feature of the remote alert and the available alerts to a concept map, and selecting an alert from the plurality of available alerts using the mapping, wherein a selected alert changes a notification preference of the system.

16 Claims, 7 Drawing Sheets

US 9,685,050 B2

ALERT SOUND ALTERATION

BACKGROUND

The present disclosure relates to an alert method, and more particularly to a method for disambiguating alert sounds.

Sounds are used as alerts by various devices; alarms, smartphones, personal computers, smartwatches, etc. These sounds are perceived by the device user and anyone in their vicinity. Exemplary alert sounds include those indicative of "new e-mail," "new instant message," etc.

BRIEF SUMMARY

According to an exemplary embodiment of the present invention, a system includes an alert module configured to generate an alert, a detector configured to detect a remote alert, and a disambiguation module configured to update, based on the remote alert, a notification preference of the system specifying an alert.

According to an exemplary embodiment of the present invention, a method of updating a notification preference of a system includes detecting, by a detector of the system, a remote alert, identifying, by a disambiguation module of the system, at least one feature of the remote alert, determining, by the disambiguation module of the system, a plurality of alerts available to the system, mapping, by the disambiguation module of the system, the at least one feature of the remote alert and the available alerts to a concept map, and selecting, by the disambiguation module of the system, an alert from the plurality of available alerts using the mapping, wherein a selected alert changes a notification preference of the system.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

BRIEF DESCRIPTION OF THE SEVERAL VIEWS OF THE DRAWINGS

Preferred embodiments of the present invention will be described below in more detail, with reference to the accompanying drawings.

DETAILED DESCRIPTION

According to an exemplary embodiment of the present invention, a system scans for alert sounds and updates its own notification preference based on a detected alert sound. In at least one embodiment of the present invention, the scanning is an auditory scanning identifying sounds emitted by another device. In at least another embodiment, the scanning is an electronic scanning for data stored on another device and corresponding to a notification preference of the another device. In still another embodiment, the scanning includes both the auditory scanning and the electronic scanning In view of the foregoing, the system, which itself includes means for generating an alert, updates a notification preference (e.g., a preferred alert selected to be emitted by the system upon the occurrence of a specific event) to reduce the likelihood that different devices will use the same alert or similar alerts, thereby reducing the likelihood for confusion among device users about the source of an alert.

According to an embodiment of the present invention, the system is embodied in a tablet device, a laptop computer, a desktop computer, a mobile phone, a pager, a smartwatch, a fitness tracking device, or an augmented reality system (e.g., head-up display). It should be understood that the system is not limited to the embodiments presented in this disclosure and that various other embodiments are contemplated.

According to an embodiment of the present invention, the system maps alerts to events on a device, and the mapping is updated based on certain input determined from the scanning of the ambient sounds and/or from preferences of other devices in the vicinity. An alert notification preference of the device is updated based on the input, such that the device generates an alert corresponding to the updated alert notification preference upon the occurrence of a corresponding event. These events include receiving e-mail, text messages, telephone calls, event messages (e.g., calendar events), feed notifies (e.g., Really Simple Syndication (RSS) feed notifications), Wireless Emergency Alerts (WEA), etc. The events described herein are exemplary and are not limiting. Alerts can be generated in connection with various other events.

Figure 1:
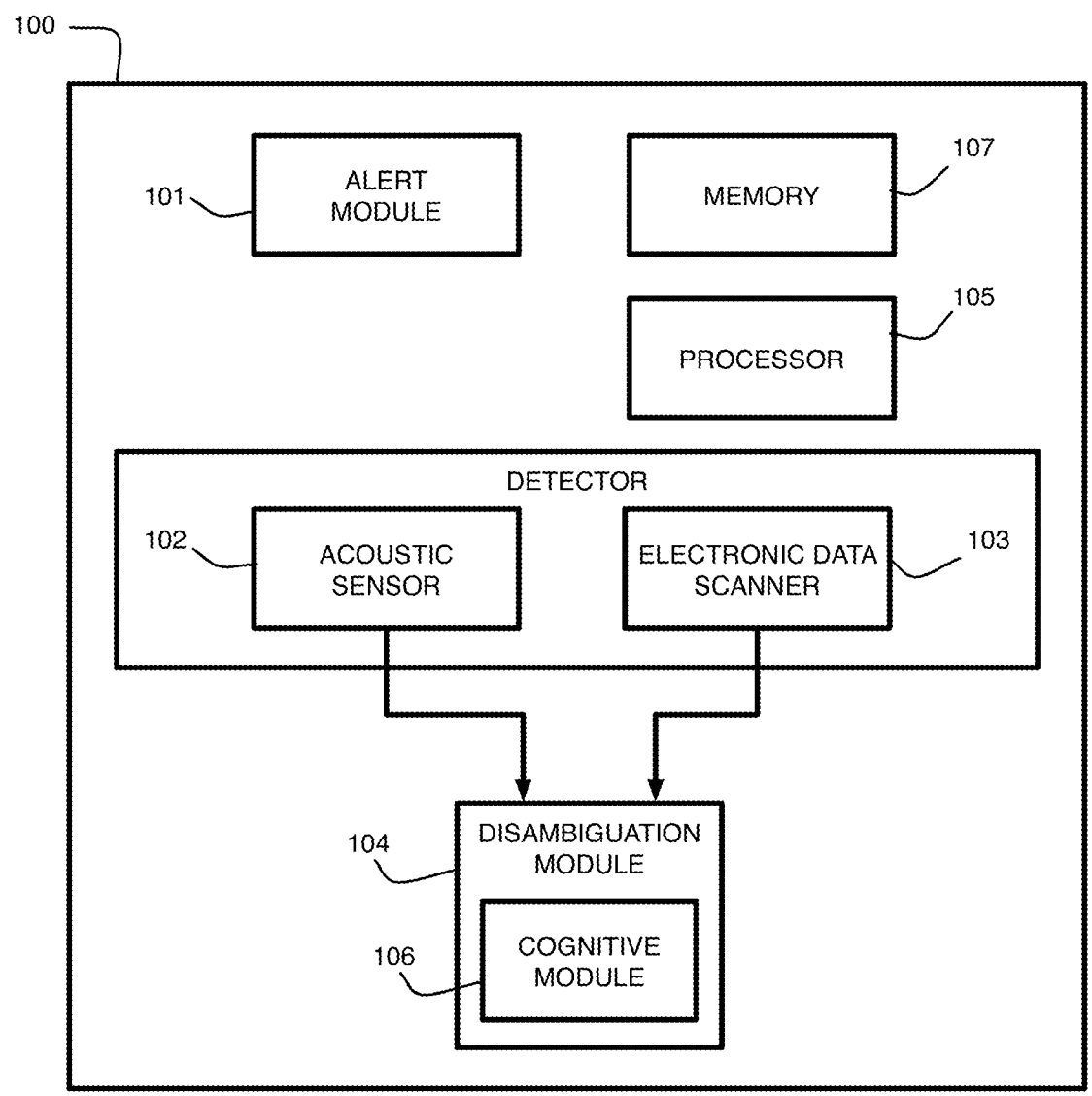
FIG. 1 is a diagram of a system configured to updated alert sounds according to an exemplary embodiment of the present invention.

Referring to FIG. 1, according to an embodiment of the present invention a system 100 includes an alert module 101 configured to generate an alert such as an audible alert sound, a vibration based alert and/or a light based an alert. In at least one embodiment, the system 100 includes an acoustic sensor 102 configured to detect sounds emitted by other devices, which are alerts remote to the system 100. In one or more embodiments, the system 100 includes an electronic data scanner 103 configured to detect or determine a currently selected notification preference of other devices. The system 100 includes a disambiguation module 104 configured to update the system's own notification preferences to change an alert associated with a notification preference based on a detected sound and/or a currently selected notification preference of another device.

Herein, the acoustic sensor 102 and the electronic data scanner 103 are generally referred to as a detector.

According to an embodiment of the present invention, the alert module 101 comprises one or more of a speaker configured to emit an alert sound, a vibration motor and a light (e.g., a light emitting diode). It should be understood that still other mechanisms for generating alerts are contemplated and that embodiments of the present invention are not limited to specific examples described herein. For example, in yet another embodiment, the alert is generated as a textual message appearing on a screen.

According to an embodiment of the present invention, the acoustic sensor 102 comprises a microphone configured to listen for ambient sounds. In at least one embodiment of the present invention, the electronic data scanner 103 is a software application executed by the processor 105 to communicate with other devices in the vicinity to poll for data about notification preferences. In yet another embodiment of the present invention, the electronic data scanner 103 is a receiver for receiving data broadcast by other devices about notification preferences.

According to an embodiment of the present invention, the detector (e.g., acoustic sensor 102 and/or electronic data scanner 103) and the disambiguation module 104 cooperate to assess detected sounds. For example, in one or more embodiments of the present invention, the system 100 determines a measure of similarity between a sound detected (e.g., an audible sound or a sound detected as a file stored on another device) by the detector and a sound currently set as a preference (e.g., a sound selected to indicate a newly arrived e-mail) for the system 100. The measure of similarity can be based on differences in sounds, default volumes of sounds, the type of sounds (e.g. synthetic voice vs. a beep), sound acoustics, sound duration, pitch, sound attack, sustain, and decay rates, etc. It should be understood that sound acoustics can include features including volume, pitch, frequency distribution, power spectrum, timbre, ADSR (Attack Decay Sustain Release) envelope, etc.

According to an embodiment of the present invention, updates to the notification preferences increase the ability of a user to distinguish an alert of their own device from the alert of another device, increase the ability of the user to distinguish an alert of their own device from an alert on another device of the same user, and/or increase the ability of the user to distinguish different kinds of alerts (e.g. new e-mail vs new instant message).

According to an embodiment of the present invention, the system 100 requests authorization from the user to change a notification preference. Such a change can include changing from one alert sound to another alert sound, from an alert sound to a vibration type notification, or from an alert sound to a visual notification. The request for authorization may require the user to press a real or virtual button, shake the device, verbally acknowledge the request, etc.

According to one or more embodiments of the present invention, the alert sound is replaced by a vibration type notification, and that the system may select a vibration type notification (e.g., "-.-") that is different than a vibration type notification (e.g., " . . . ") determined to be used by a device in the vicinity. That is, the system 100 can be configured to determine unique alert sounds, vibration type notifications, light type notifications (e.g., colors or flash patterns), etc., which may be output by the alert module 101

The update of the notification preferences includes changing alerts using intelligent suggestions from the system 100. For example, in one exemplary embodiment, the system 100 presents multiple options from which a user can select an alert to use as the updated alert. In another example, the notification preference is changed automatically. In yet another exemplary embodiment the currently selected notification preference is augmented, for example, where the user's selected ring tone is augmented with an audible pre-fix changing "ring-tone" to "ID, ring-tone." In this case the "ID" can be the name of the device embodying the system, the name of the user, a random identification set of the user, etc. In this way, the system 100 can continue to use the user's preferred alert sound and include additional information to disambiguate the alert sound from another's alert sound.

According to one or more embodiments of the present invention, the disambiguation module 104 includes a cognitive module 106 that takes into account characteristics of different alerts in updating a current preference. These characteristics can include a level of annoyance (e.g., whether the sound is generally pleasing versus whether the sound is generally harsh), a capability to get attention. The cognitive module 106 can select an updated alert to increase one characteristic and decrease another, to select an updated alert that maximizes a combination of characteristics, etc. The assessment of a detected alert takes into consideration information about an event causing the alert (e.g., the content of the event, a sender of an e-mail, etc.) and uses this information to alter the preferred alert in conjunction with analyses of alerts (e.g., sounds, vibrations, etc.) within some radius R.

According to one or more exemplary embodiments, the radius R is determined using a mapping of IP (Internet Protocol) addresses of different devices to physical locations (e.g., adjacent rooms, etc.). For example, in a building include a plurality of offices, many of the offices may have respective machines (e.g., desktop computers, printers, etc.) installed and connected to a network. It should be understood that the addresses (e.g., a Media Access Control or MAC address or the like) and the locations of the different machines are known (e.g., machine 1234 is located in room 101). Given this information, a given machine can determine whether there are other machines are located within some radius R and automatically select alert sounds that are distinct from other alert sounds selected by the other machines. In at least one embodiment of the present invention, a machine makes a user aware of the alert sounds used in the vicinity and offers a choice between alert sounds that are determined to be different than the alert sounds used by other machines. In at least another embodiment, the radius R is inferred (e.g., by sound localization using a microphone array), with a certain confidence level, by volume or other properties.

According to one or more embodiments of the present invention, an assessment of a detected sound (e.g., to determine if it is likely to be an alert sound of another device) uses acoustic measurements taken in real time (e.g., measurements of the ambient). According to one or more embodiments of the present invention, the assessment takes into account ambient noise spectral qualities. The disambiguation module 104 searches a plurality of known alert sounds stored in the system's memory 107 for an alert sound that matches the spectral properties of a transient noise, and selects an alert sound (e.g., an updated alert sound) that will operate in a free band, different than the transient noise.

According to one or more embodiments of the present invention, the assessment of a sound takes into account ambient noise identity (e.g., dog barking, crying, machinery, etc.), by means of sound analysis. The disambiguation module 104 searches for alert sounds that match identity properties of a transient cognitive identity band that is free from interference from the identities of the ambient sounds. For example, a mechanical type alert sound is selected when animal sounds are part of the ambient. In another example, an animal sound (e.g., a synthetic dog bark or bird tweet) is selected when mechanical sounds are part of the ambient.

According to one or more embodiments of the present invention, the assessment uses a concept map stored in memory 107 to find distant alert sound identifier. The concept map is a lexical database providing a cognitive metric of semantic distance or similarity of different alert sound identifier. Various methods exist for measuring semantic distance among the words and sets of cognitive synonyms in a concept map graph structure. According to an exemplary embodiment of the present invention, these methods can be tasked for measuring semantic distance between alert sounds. According to one or more embodiments of the present invention, the concept map comprises a database of isolated alert sounds linked to concepts (e.g., conceptual categories of sound such as animal sounds, synthesized sounds, mechanical sounds, etc.), wherein the database can be analyzed for semantic distances between alert sounds used by different devices (e.g., set as respective notification preferences of the different devices).

It should be understood the system memory stores, for example, the plurality of known alert sounds, and identifiers (e.g., file names such as "ringout.wav" or "chimes.wav") of the known alert sounds corresponding to identifiers (e.g., names) of different software applications that are known to use the alert sounds.

According to an exemplary embodiment of the present invention, by examining the identifiers of the alerts, the disambiguation module 104 of the system 100 can learn information about the likely sounds they would make. By examining the data within the files (e.g., the digital audio signal waveform information), the disambiguation module 104 can determine the nature of the sound. For example, the system can guess that WAV (Waveform Audio File Format) files named "dog-bark.wav" and "cow-moo.wav" are likely to be animal sounds. In this way, the disambiguation module 104 can determine data useful in measuring semantic distance among alerts. That is, a semantic distance can be determined using specific data about an alert (e.g., a waveform of an alert sound) or general data (e.g., a categorization of the alert determined using the file name).

Figure 2:
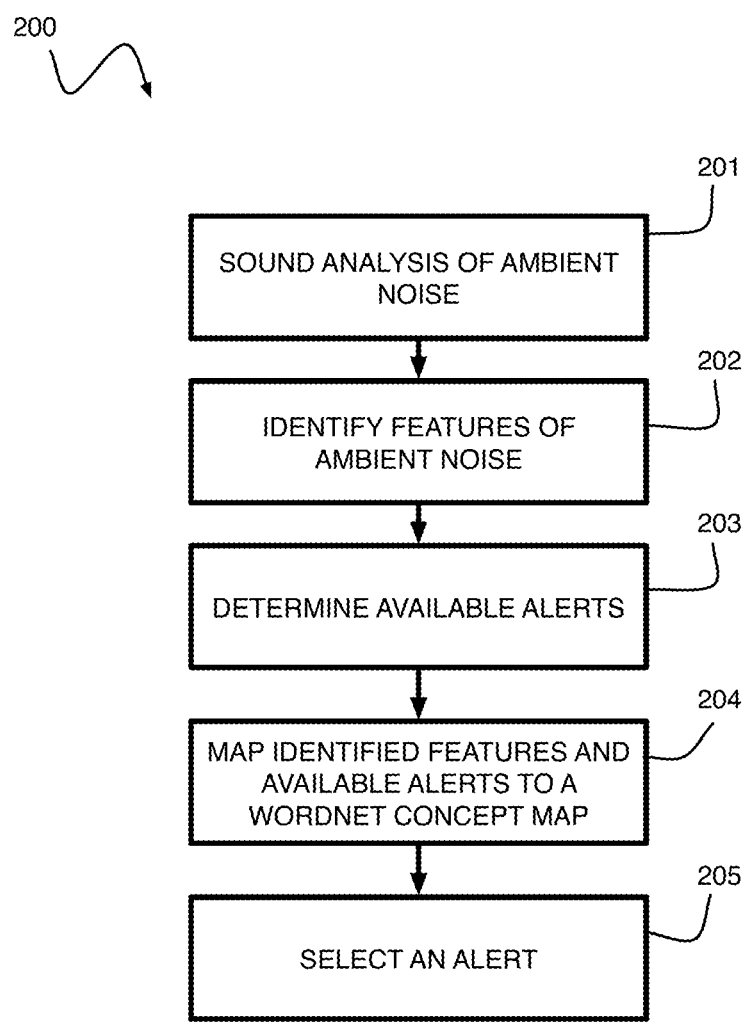
FIG. 2 is a flow diagram of method performed by a system configured to updated alert sounds according to an exemplary embodiment of the present invention.

Referring to FIG. 2, according to an embodiment of the present invention a method 200 includes analyzing ambient noise 201, identify at least one feature (e.g., an alert sound emitted by another device) of the ambient noise 202, determining available sound alerts and their identifiers 203, mapping the identified feature of the ambient and the available sound alerts to the concept map 204, and selecting an alert 205 (e.g., one that is most distant from the identified features of the ambient) to update a notification preference based on the feature of the ambient, the available sound alerts and the mapping. In one or more embodiment of the present invention, the methods of blocks 201-205 are performed by the system 100 using the disambiguation module 104.

According to one or more embodiments of the present invention, the similarity detection is supported an automated analysis of sounds from a plurality of formats (e.g., .MP3, .AAC, .M4A, .WMA, .OGG, .WAV, .FLAC, .APE, .WV, .MPC) to find similar compositions among them. The list of supported formats described herein is not limiting.

According to one or more embodiments of the present invention, the disambiguation module 104 includes one or more of a tag editor for editing ID3 tags (e.g., metadata used in conjunction with an alert sound), a spectrum analyzer, a sonogram analyzer, an automatic tag converter, and an accelerator (e.g., using OpenCL technology) supporting a video card.

Figure 3:
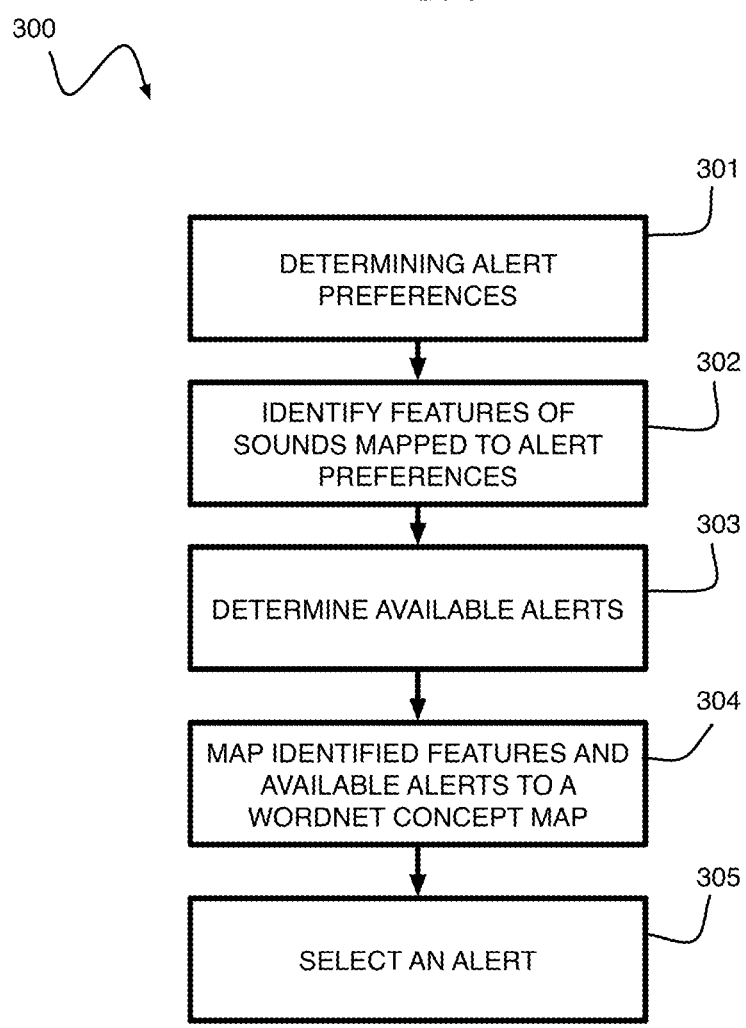
FIG. 3 is a flow diagram of method performed by a system configured to updated alert sounds according to an exemplary embodiment of the present invention.

Referring to FIG. 3, according to an embodiment of the present invention a method 300 includes determining one or more devices for alert preferences 301 (e.g., performed by the electronic data scanner 103), identifying at least one feature (e.g., an alert sound set as a notification preference by another device) of an alert sound mapped to the alert preferences of the other device 302, determining available sound alerts and their identifiers 303, mapping the identified feature of the alert sound set as the notification preference by the other device and the available sound alerts to the concept map 304, and selecting an alert 305 (e.g., one that is most distant from the identified feature of the alert sound set as the notification preference by the other device) to update a notification preference based on the feature of the alert sound set as the notification preference by the other device, the available sound alerts and the mapping. In one or more embodiment of the present invention, the methods of blocks 302-305 are performed by the system 100 using the disambiguation module 104.

At block 301, according to an embodiment of the present invention, the determination of the alert preferences can be by polling other devices in the vicinity (e.g., on the same wireless local area network, within a predetermined distance determined using a GPS function, etc.). For example, the system 100 can poll other devises, e.g., by a request or query, on the same network for notification preferences. According to one or more embodiments, the determination at block 301 uses data broadcast by other devices (e.g., broadcast using the Bluetooth wireless standard) to receive information about the notification preferences of other devices. At least in the case of Bluetooth, devices capable of establishing a connection are known to be in the vicinity of one another due to the distance limitations of a Bluetooth connection (e.g., within about 10 meters for a class 2 broadcast).

The methodologies of embodiments of the disclosure may be particularly well-suited for use in an electronic device or alternative system. Accordingly, embodiments of the present invention may take the form of an entirely hardware embodiment or an embodiment combining software and hardware aspects that may all generally be referred to herein as a "processor," "circuit," "module" or "system."

Furthermore, it should be noted that any of the methods described herein can include an additional step of providing a system 100 configured to disambiguate alerts. Further, a computer program product can include a tangible computer-readable recordable storage medium with code adapted to be executed to carry out one or more method steps described herein, including the provision of the system with the distinct software modules.

Figure 4:
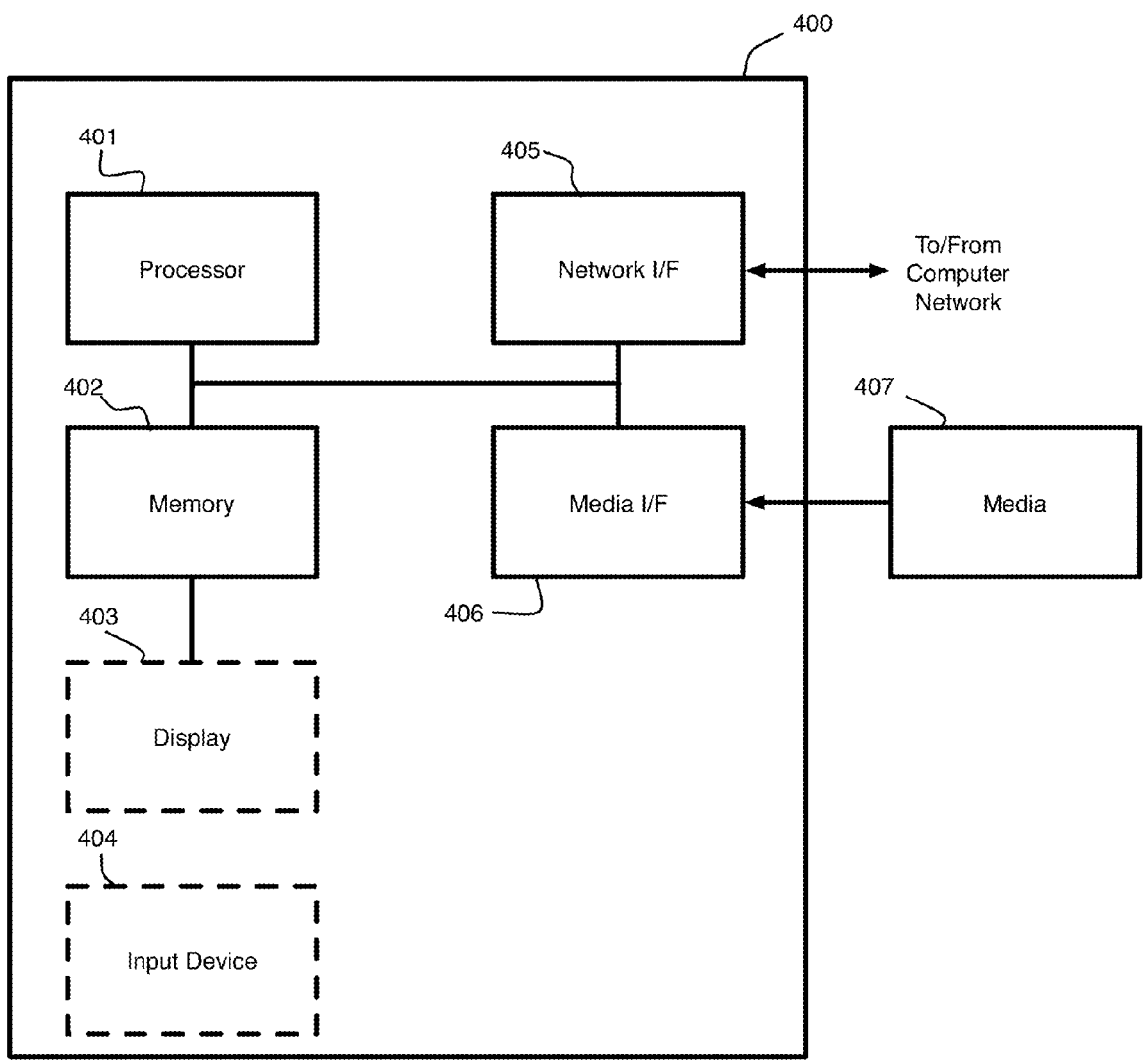
FIG. 4 is a diagram of a computer system configured to perform the operations of a system configured to updated alert sounds according to an exemplary embodiment of the present invention.

Referring to FIG. 4; FIG. 4 is a block diagram depicting an exemplary computer system embodying the system 100 configured to disambiguate alerts (see FIG. 1) according to an embodiment of the present invention. The computer system shown in FIG. 4 includes a processor 401, memory 402, display 403, input device 404 (e.g., keyboard), a network interface (I/F) 405, a media I/F 406, and media 407, such as a signal source, e.g., camera, Hard Drive (HD), external memory device, etc.

In different applications, some of the components shown in FIG. 4 can be omitted. The whole system shown in FIG. 4 is controlled by computer readable instructions, which are generally stored in the media 407. The software can be downloaded from a network (not shown in the figures), stored in the media 407. Alternatively, software downloaded from a network can be loaded into the memory 402 and executed by the processor 401 so as to complete the function determined by the software.

The processor 401 may be configured to perform one or more methodologies described in the present disclosure, illustrative embodiments of which are shown in the above figures and described herein. Embodiments of the present invention can be implemented as a routine that is stored in memory 402 and executed by the processor 401 to process the signal from the media 407. As such, the computer system is a general-purpose computer system that becomes a specific purpose computer system when executing routines of the present disclosure.

Although the computer system described in FIG. 4 can support methods according to the present disclosure, this system is only one example of a computer system. Those skilled of the art should understand that other computer system designs can be used to implement embodiments of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 5:
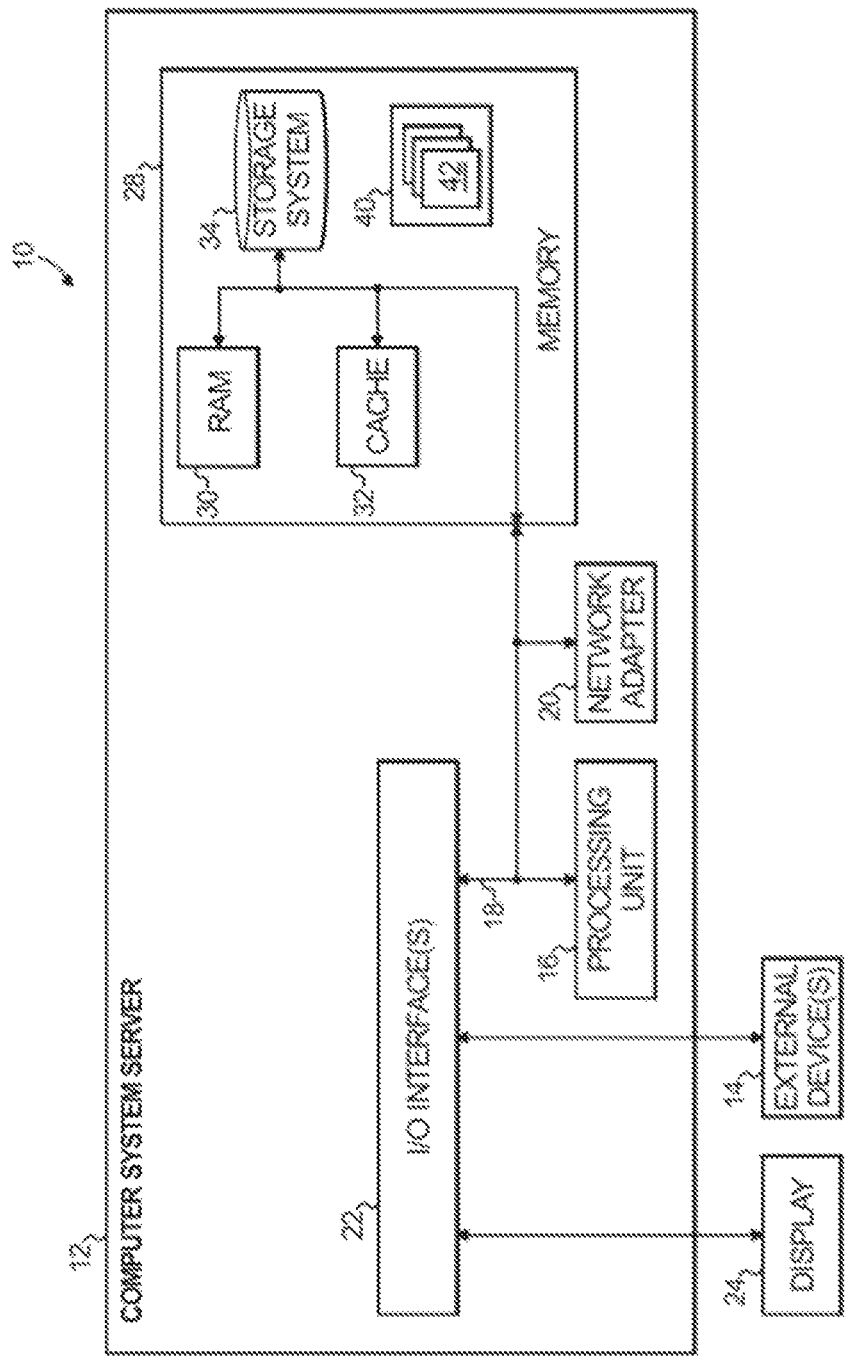
FIG. 5 depicts a cloud computing node according to an embodiment of the present invention.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Figure 6:
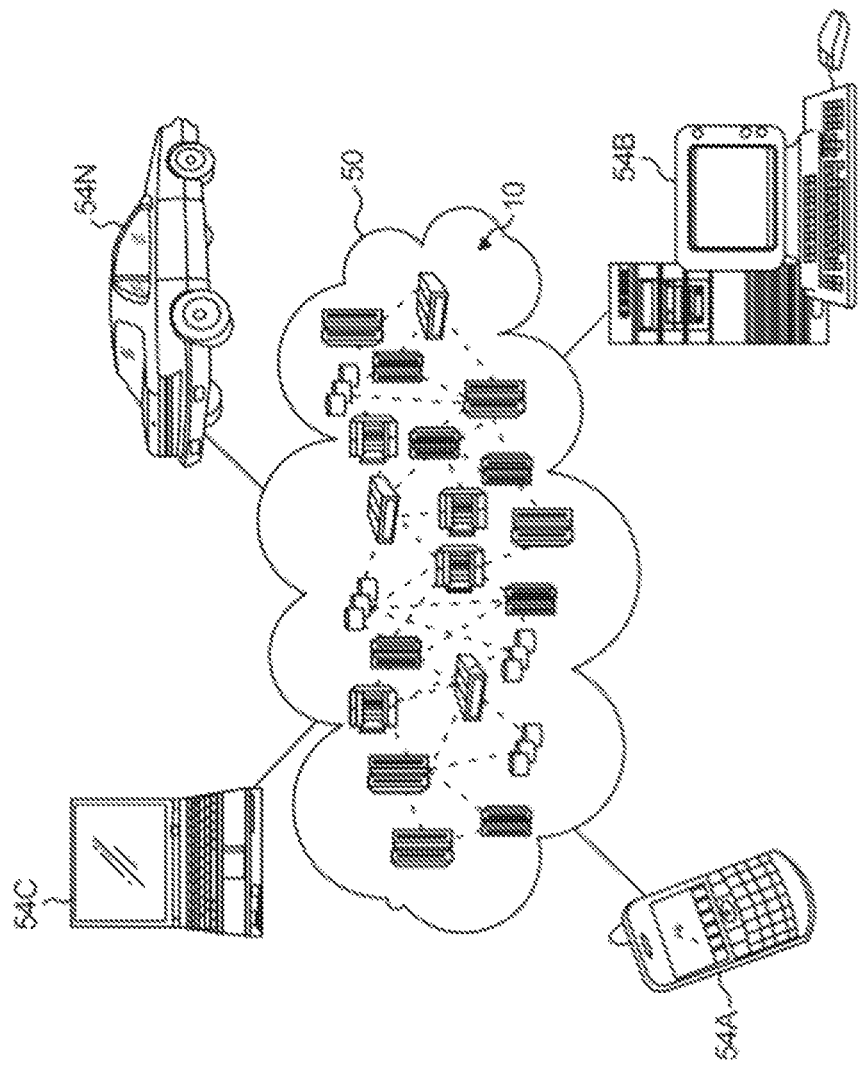
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
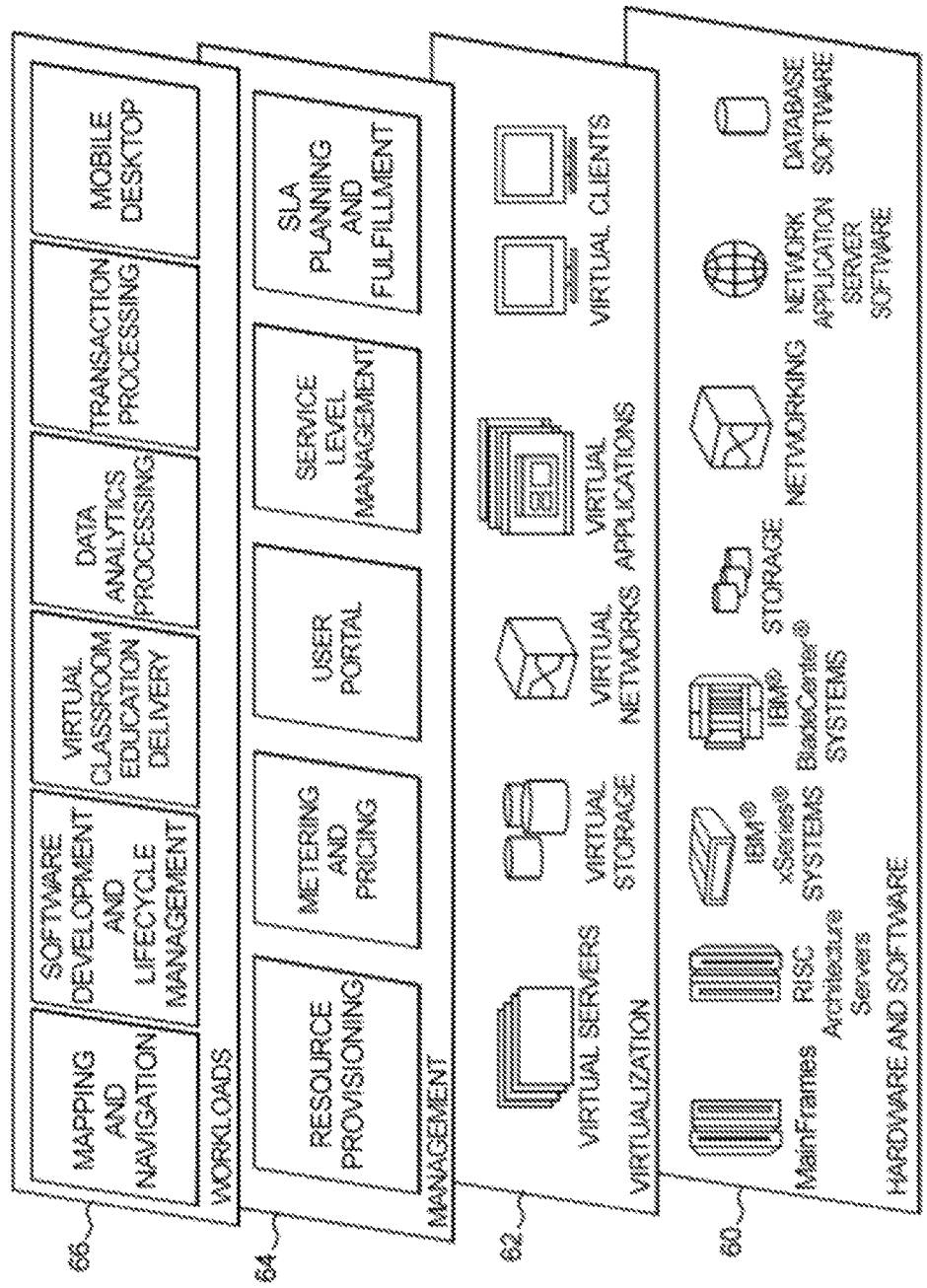
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method updating a notification preference of a system, the method comprising:
   detecting, by a detector of the system, a remote alert;
   identifying, by a disambiguation module of the system, at least one feature of the remote alert;
   determining, by the disambiguation module of the system, a plurality of alerts available to the system;
   mapping, by the disambiguation module of the system, the at least one feature of the remote alert and the available alerts to a concept map; and
   selecting, by the disambiguation module of the system, an alert from the plurality of available alerts using the mapping, wherein a selected alert changes a notification preference of the system,
   wherein the selected alert changes the notification preference of the system, and wherein the selection of the selected alert from the plurality of available alerts using the mapping further comprises selecting the selected alert based on a measure of semantic distance between the remote alert and each of the alerts available to the system.

2. The method of claim 1, further comprising:
   detecting an event corresponding to the notification preference; and
   generating the selected alert according to the notification preference.

3. The method of claim 1, wherein detecting the remote alert comprises analyzing an ambient noise.

4. The method of claim 1, wherein detecting the remote alert comprises polling a remote device for a corresponding notification preference, wherein the corresponding notification preference of the device specifies the remote alert.

5. The method of claim 1, wherein detecting the remote alert comprises receiving a broadcast from a remote device specifying a corresponding notification preference of the remote device, and wherein the corresponding notification preference of the remote device specifies the remote alert.

6. The method of claim 1, wherein selecting the alert from the plurality of available alerts using the mapping comprises selecting an augmentation of a currently selected alert.

7. The method of claim 1, wherein selecting the alert using the measure of semantic distance between the remote alert and each of the alerts available to the system, wherein the alert selected is most distant from the remote alert.

8. The method of claim 1, wherein selecting the alert comprises selecting one of a vibration type alert and a light type alert to update the notification preference.

9. A computer program product for disambiguating alerts, the computer program product comprising a computer readable storage medium having program instructions embodied therewith, the program instructions executable by a processor to cause the processor to:
   detecting a remote alert;
   identifying at least one feature of the remote alert;
   determining a plurality of alerts available to a system;
   mapping the at least one feature of the remote alert and the available alerts to a concept map; and
   selecting an alert from the plurality of available alerts using the mapping,
   wherein the selected alert changes a notification preference of the system, and wherein the selection of the selected alert from the plurality of available alerts using the mapping further comprises selecting the selected alert based on a measure of semantic distance between the remote alert and each of the alerts available to the system.

10. The computer program product of claim 9, further comprising:

detecting an event corresponding to the notification preference; and generating the selected alert according to the notification preference.

11. The computer program product of claim 9, wherein detecting the remote alert comprises analyzing an ambient noise.

12. The computer program product of claim 9, wherein detecting the remote alert comprises polling a remote device for a corresponding notification preference, wherein the corresponding notification preference of the device specifies the remote alert.

13. The computer program product of claim 9, wherein detecting the remote alert comprises receiving a broadcast from a remote device specifying a corresponding notification preference of the remote device, and wherein the corresponding notification preference of the remote device specifies the remote alert.

14. The computer program product of claim 9, wherein selecting the alert from the plurality of available alerts using the mapping comprises selecting an augmentation of a currently selected alert.

15. The computer program product of claim 9, wherein selecting the alert using measure of semantic distance between the remote alert and each of the alerts available to the system, wherein the alert selected is most distant from the remote alert.

16. The computer program product of claim 9, wherein selecting the alert comprises selecting one of a vibration type alert and a light type alert to update the notification preference.

\* \* \* \* \*